Patented Oct. 12, 1937

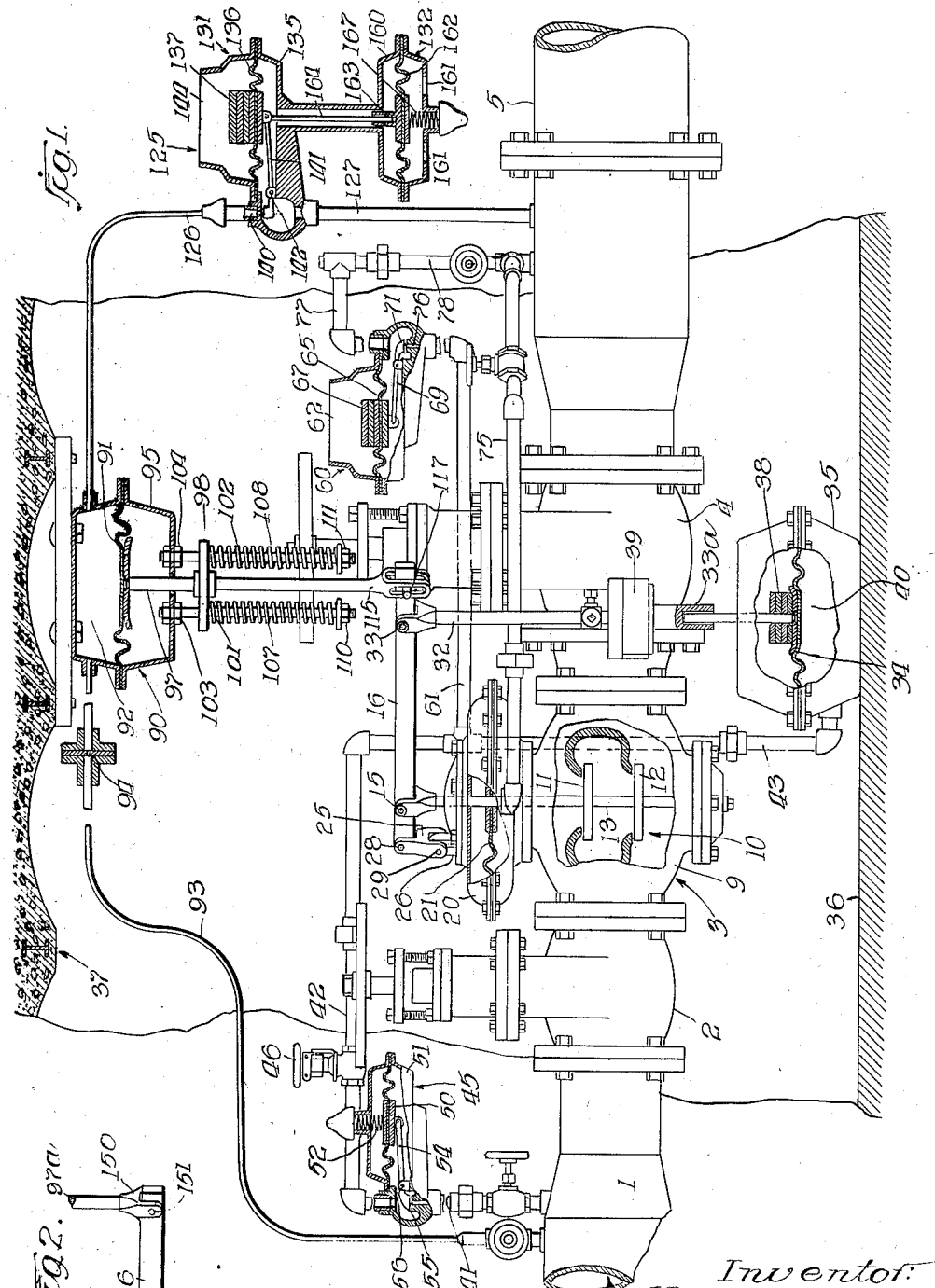

2,095,426

UNITED STATES PATENT OFFICE 2,095,426

SAFETY CONTROL FOR GAS GOVERNORS

Kenneth S. Van Epps, Maywood, Ill.

Application August 17, 1936, Serial No. 96,553

12 Claims. (Cl. 48—191)

The present invention relates generally to devices in the nature of governors and the like for controlling the distribution of gas and for controlling the pressure at which the gas is delivered to the consumer.

The principal object of the present invention is the provision of a control mechanism that insures the closing of the distributing governor or valve, controlling the gas flow, in the event that the outlet pressures become excessive or in the event that, for any reason, control of the valve is interfered with so that it no longer functions properly. Usually gas distribution governors are disposed in governor vaults which, in some instances, may be subject to being flooded by water, and another object of the present invention in this connection is to take care of flood water and other irregular conditions by shutting off or closing the gas distribution valve when such conditions occur.

An additional object of the present invention is the provision of a control for gas distribution governors that can either take the place of the present control system or, if desired, may supplant the same and be used as a separate and independent control for the distributing governor valve in the gas main.

These and other objects and advantages of the present invention will be apparent to those skilled in the art after a consideration of the following detailed description of the preferred construction, taken in conjunction with the accompanying drawing illustrating such construction.

Figure 1 illustrates a safety control, constructed in accordance with the principles of the present invention, which can be used in connection with known gas distribution governors, or which may be used as an independent control, as desired; and Figure 2 illustrates a connection that is desirable when my device is used as an independent control.

The modern gas system is made up of an interconnected network of low pressure gas mains of various sizes known as the distribution system. Customers' services are connected to this network distribution system. The gas supplying the low pressure distribution system is brought into centrally located points by high pressure mains known as the transmission system, which may or may not have network characteristics. The only connections between the transmission system and the distribution system are made at the centrally located points through a pressure reducing mechanism known as a distribution governor which is generally located in an underground vault. The object of this type of system is to eliminate an individual regulator for each customer by substituting a large governor to take care of a large number of customers and over large areas of the distribution system. These gas distribution governors include valves which are opened and closed by regulator mechanism that is responsive to the outlet pressure at which the gas is ultimately delivered. For example, in a system with which I am familiar, the gas is supplied to the distribution points at approximately a pressure of five pounds, but as the gas is fed into the distribution mains, its pressure is reduced to approximately six inches of water by the use of a distribution governor that is opened and closed by regulating mechanism so as to secure the desired pressure drop.

Referring now to the drawing, the high pressure gas is supplied through a main 1 past a manually controlled shut-off valve 2 to a gas distribution governor that is indicated in its entirety by the reference numeral 3. Here the pressure is reduced and the gas delivered past a shut-off valve 4 into the distribution main 5 at a delivery pressure, which may be in the nature of a pressure equal to six inches of water, as pointed out above. As illustrated, the gas distribution governor valve includes a valve body 9 and valve closure means 10 in the form of discs 11 and 12 connected to a shiftable valve stem 13, the upper end of which is pivotally connected, as at 15, to an operating arm or lever 16. The valve body 3 carries a casing 20 in which a governor head diaphragm 21 is preferably disposed, the diaphragm being fastened to the valve stem 13 and not only sealing the movable valve stem to the valve body casing but cooperating with regulating means, to be described later, in controlling the gas governor valve 10. If desired, however, the diaphragm 21 and associated parts may be eliminated and replaced with a suitable gland of conventional construction.

As heretofore practiced in the art, the valve 10 is controlled by means that is biased to open the valve, but which may be regulated or closed by the gas pressure. To this end, the arm or beam 16 is pivotally anchored by means of a link 25 to a lug 26 formed on or carried by the diaphragm casing 20, the beam 16 being pivotally connected at 28 to the link 25, and the latter being pivotally connected at 29 to the lug 26. Upward movement of the lever 16 thus closes the valve 10, and downward movement of the lever opens the valve.

A link 32 is pivotally connected, as at 33, to the outer end of the lever or beam 16 and extends downwardly and is connected through a slip joint 33a at its lower end to a diaphragm 34 forming a part of a control unit 35 that is usually supported on the floor 36 of the gas governor vault 37. The diaphragm 34 is weighted by weights 38 and 39, the former being carried on the diaphragm 34 directly and the other weight being fastened to the lower portion of the link 32. Gas from the high pressure side of the valve 10 is led into the lower portion or chamber 40 of the unit 35 underneath the diaphragm 34 by means of a conduit or pipe line consisting of the sections 41, 42 and 43, and a regulating unit 45. A needle valve 46 is included in one of the pipe sections and serves to limit the rate of flow from the high pressure side of the governing valve 10 to the controlling diaphragm 34.

The control unit 45, known as the first auxiliary regulator, is of well known construction and includes a diaphragm 50 supported in the central portion of the casing 51 and biased for movement in one direction by a spring 52. The lower side of the diaphragm engages a lever 54 which is pivoted, as at 56, to the casing, and has an end 55 controlling the flow of gas through the outer end of the pipe section 41. When the pressure on the low pressure side of the valve 55 rises, the diaphragm 50 moves upwardly and restricts or entirely seals the flow of gas out of the section 41. When the pressure falls, the valve 56 is opened and allows a flow of gas to pass into the space under the diaphragm 50. Thus, the unit 45 serves to maintain a certain maximum pressure in the pipes leading to the controlling diaphragm 34 which is opposed by the weights 38 and 39, and with a given amount of weights, or bias, the diaphragm 34 will be held up and will act through the beam 16 to maintain the valve 10 in a given position so long as the pressure in the chamber 40 is maintained.

Flow of gas from the chamber 40 underneath the diaphragm 34, so as to permit one or both of said weights to swing the arm or beam 16 downwardly and open the valve 10, is ordinarily under the control of a second auxiliary regulator, indicated in its entirety by the reference numeral 60, which is connected into the pipe section 43 by a pipe 61. The regulator unit 60 is well known and is quite similar to the unit 45 except that the upper part of the casing is open to the atmosphere within the vault, as indicated at 62. The unit 60 includes a diaphragm 65 upon which one or more weights 67 are placed. The diaphragm 65 is connected to a pivoted lever 69, and the latter includes an end 71 which controls the flow of gas outwardly from the chamber 40 through a nozzle 76 to which the pipe or conduit section 61 leads. Interconnected pipes 77 and 78 lead from the chamber below the diaphragm 65 to the low pressure side of the gas governor valve 10, thus causing the movement of diaphragm 65 to be in direct accord with the pressure on the low pressure side of valve 10 and also with low pressure distribution main. The pipe 75 places the lower side of the diaphragm 21 in communication with the pressure within the distribution main 5.

The weights 67 are so adjusted that when the pressure on the low pressure side of the valve 10 falls, the diaphragm 65 lowers and swings the end 71 of the lever 69 away from the associated nozzle, whereupon a quantity of gas is bled out of the chamber 40 and into the low pressure mains. Since the gas from the high pressure side can flow into this chamber only at a predetermined rate, less than the outflow, the weights 39 swing the beam 16 downwardly and this opens the valve 10 and, in turn, acts to build up the pressure within the delivery mains 5 until the flow of gas through the section 61 is terminated by the closing of the valve 71 upon the attainment of the desired delivery pressure. By this means, the position of the distribution governor valve 10 is controlled in accordance with the pressure on the low side of the valve so as to maintain that pressure substantially uniform.

One disadvantage of the control means that has just been described is that in order to secure the necessary sensitivity, the diaphragm 50 and 65 must be soft and flexible, usually being made of sheepskin or similar material and replaced once a year. Also, upon any failure of the regulating unit 45 or 60 of the main operating diaphragm 34, the weights 38 and 39 will drop, thus opening the valve 10. This is an undesirable feature, for in the event of such failure, uncontrolled quantities of gas would pass from the high pressure side into the low pressure side of the system and would disturb pressure conditions for a considerable area throughout the latter. Further, any increase in delivery pressure above the normal desired pressure cannot operate to close the governor valve 10.

According to the principles of the present invention, means has been provided to serve as a safety control for the above described mechanism so that in the event of failure of such mechanism, the distributing governor valve will not be opened wide but will be closed either fully or partially, as may be required. Also, as will be described later, the control means constituting the principal part of the present invention may be used, where desired, to supplant the gas distribution control system described above.

A second diaphragm unit 90 is anchored to the roof of the vault 37 and is preferably, but not necessarily, quite similar in construction to the operating diaphragm unit 35 mentioned above. A diaphragm 91 forms one wall of a chamber 92 that communicates with the high pressure side of the governor valve 10 by means of a tube 93 in which an orifice 94 is placed, the tube and orifice serving to limit the rate of flow of gas from the high pressure side of the valve 10 to the chamber 92 formed by the diaphragm 91 and the associated portions of the casing 95 of the unit 90. A stem 97 extends downwardly from the diaphragm 91 and has a plate 98 fixed thereto which is movable along a pair of long anchoring bolts 101 and 102 carried by and fixed, as at 103 and 104, to the lower part of the casing 95. A pair of relatively heavy springs 107 and 108 are disposed about the lower portions of the anchoring bolts 101 and 102, and the springs 107 and 108 are compressed between the plate 98 and adjusting nuts 110 and 111 at the lower ends of the bolts 101 and 102. The stem 97 is extended downwardly below the springs 107 and 108, and, in the preferred form of the present invention, is provided with a bifurcated and slotted section 115 embracing the outermost end of the valve controlling arm or beam 16. The outer end of the latter carries a pin 117 that is disposed in the slots in the lower end 115 of the stem 97. The slots in the section 115 form a lost motion connection between the stem 97 and the controlling arm 16.

permitting the control of the valve to be performed by the diaphragm 34 and associated mechanism, but providing for the replacement of such control whenever the stem 97 is moved, either by the diaphragm 91 or the springs 107 and 108, farther than the extent of the slotted portions of the stem section 115.

The flow of gas from the chamber 92 is controlled by a regulator that is indicated in its entirety by the reference numeral 125, and is connected with the chamber 92 by a tube 126 and with the low pressure side of the valve 10 by a pipe connection 127. The regulator 125 consists of two units, 131 and 132, operatively interconnected together as will be described later. The unit 131 is quite similar in physical construction to the regulator 60, but is larger and of sturdier construction. The unit 131 includes a casing 135 in which the diaphragm 136 is disposed and is provided with weights 137 to fix or control the responsiveness of the diaphragm. The casing 135 communicates with the low pressure side of the system by means of the pipe 127 mentioned above, and with the chamber 92 through the tube 126 and the nozzle or orifice 140. The flow of gas through the orifice or nozzle is controlled by a pivoted lever 141 having one end connected with the diaphragm 136 to be actuated thereby, and the other end disposed in operative association with the orifice 140. The lever 141 is pivoted to the casing 135 by any suitable means, as indicated at 142. The casing 135 is open to the atmosphere, as indicated at 144, so that the diaphragm 136 is subjected to the pressure difference that exists between atmospheric pressure within the vault and the pressure of the gas on the low pressure side of the governing valve 10. Preferably, both of the diaphragms 91 and 136 are made of extra heavy rubber duct ply material.

When the safety control means of the present invention is used in conjunction with the known regulating mechanism, the weights 137 are adjusted so as to make the unit 131 responsive to a slightly higher pressure than the normal pressure on the low pressure side of the valve 10, usually in the nature of six inches of water, as determined by the regulator 60. Thus, normally, the orifice 140 is kept closed at all times, and since no gas can escape from the chamber 92, gas from the high pressure side flows through the tube 93 and into the chamber 92, forcing the diaphragm 91 downwardly and compressing the springs 107 and 108 and permitting the beam 16 to be controlled by the diaphragm 34. However, the occurrence of an abnormal increase in the pressure of gas on the low pressure side of the valve 10 will cause the weights 137 to be lifted, and this opens the orifice 140 and bleeds off a quantity of gas from the chamber 92. The resulting lowered pressure at this point permits the springs 107 and 108 to expand, which forces the stem 97 upwardly and raises the beam 16 and closes the valve 10 entirely independently of the position of the diaphragm 34, by virtue of the above described slip joint 33a. Normally, this will reduce the pressure on the low pressure side of the valve 10 so that as soon as this pressure has been reduced to the proper degree, the orifice 140 will be closed and the springs 107 and 108 again compressed by gas from the high pressure side of the governor valve acting against the diaphragm 91. Thus the springs 107 and 108 serve as biased means that is normally held inactive or compressed by the pressure of the gas from the high pressure side of the valve 10 but which becomes immediately available under abnormal conditions, such as the above mentioned pressure rise, to close the valve 10, entirely irrespective of the position of the diaphragm 34. The unit 131 so regulates the gas pressure within the chamber 92 that the bleeding off of the gas is in direct proportion to the outlet pressure on the low pressure side of the valve 10. This control regulates the outlet pressure of the governor to small variations, and, if desired, can be made to entirely supplant the diaphragm 34 and the units 45 and 60 by merely pivoting the outer end of the beam to the stem 97, as illustrated fragmentarily in Figure 2. In Figure 2, the stem that is pivotally connected to the beam or lever 16 is indicated at 97a and, at its lower end, carries a yoke 150 that is connected by a pivot pin 151 to the outer end of the beam 16.

Under certain conditions the vault 37 may be flooded by water from storm sewers or some other source, and it has sometimes occurred that water gets into the space above the diaphragm 34 and forces it down, thus holding the valve 10 open and destroying all effective control that the units 45 and 60 normally exert upon it. Also, if the unit 60 should be submerged, water above the diaphragm 65 will force the latter down and will open the orifice 76 and permit gas to flow from underneath the diaphragm 34 into the low pressure side of the valve 10, and this reduction of pressure permits the weights 38 and 39 to open the valve. In order to prevent flooded vault conditions from thus destroying all control and leaving the valve 10 wide open, I have provided the above mentioned unit 132. This unit consists of a casing or housing 160 having lower openings 161 and enclosing a diaphragm 162 that is connected through a slip joint 163 with a stem 164 that is fastened at its upper end to the diaphragm 136 or to the inner end of the lever 141. A spring 167 is disposed in the lower part of the casing 160 and urges the diaphragm 162 upwardly. Like the diaphragms 91 and 136, the diaphragm 162 may be of extra heavy rubber duct material as sensitivity is not necessary.

In case of flood water rising in the vault, the safety control operates under normal conditions until the water level reaches the diaphragm 162 through the openings 161. The casing 160 is open so that when the water level rises beyond the diaphragm 162 the head of water applied against the bottom of the same lifts the upper diaphragm 136 and the weight 137 thereon and opens the orifice 140. This permits the gas above the diaphragm 91 to be bled off and thus releases the springs 107 and 108 and permits them to raise the beam 16 and close the valve 10 in substantially the same manner that the valve is closed when there is an abnormal increase in the outlet pressure on the low pressure side of the valve 10. The lower diaphragm 162 is larger than the upper diaphragm 136, so that even though both units 131 and 132 are submerged, there is still sufficient head of liquid applied against the lower diaphragm 162 to release the springs 107 and 108, for the effective water pressure will always be greater under the flood water diaphragm 162 than on the bleed off regulator diaphragm 136. Flood water entering the lower side of the casing 90 serves, in effect, to increase the force of the springs 107 and 108, tending to close off the valve 10. However, adjustments can be made, if so desired, to prevent the governor valve from being completely closed during flooded conditions.

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A control for gas distribution systems, comprising a governing valve, means biased to close said valve, means in direct communication with the gas pressure on the high pressure side of said valve for opposing said biased means and opening said valve, and a regulator responsive to gas pressure on the low pressure side of said valve for controlling the pressure opposing said biased means.

2. A control for gas distribution systems, comprising a governing valve, means biased to close said valve, means in direct communication with the gas pressure on the high pressure side of said valve for opposing said biased means and opening said valve, and a regulator responsive to gas pressure on the low pressure side of said valve for relieving the pressure opposing said biased means and providing for the operation of the latter to move said valve toward its closed position upon the occurrence of an increase in pressure on the low pressure side of said valve.

3. Gas distribution governor mechanism, comprising valve means controlling the gas flow, means biasing said valve means for movement toward closed position, a chamber including a movable wall connected to open said valve against the force of said biasing means, a conduit having a metering orifice for conducting gas from the high pressure side of said valve at a limited rate of flow into said chamber, a second conduit conducting gas from said chamber to the low pressure side of said valve, and means responsive to an increase in pressure on the low pressure side of said valve for bleeding gas from said chamber and permitting said biased means to move said valve toward its closed position.

4. A control for gas distribution systems, comprising a valve for governing gas flow, a vault housing said valve, means responsive to gas pressure on the low pressure side of said valve for controlling the position of the latter, and means responsive to a given liquid head in said vault for closing said valve independently of the gas pressure on the low pressure side of said valve.

5. A control for gas distribution systems, comprising a vault, a gas distribution governor in said vault serving to maintain a given pressure in the low pressure mains above atmospheric pressure and including a valve and a valve controlling part open to atmospheric pressure in said vault, and means including a pressure sensitive part in said vault below and independently of said first part for closing said valve in response to a given head of liquid in said vault.

6. In a gas distribution system, the combination with a gas governor comprising a valve, means actuated by the pressure on the high pressure side of said valve for closing said valve, and means opposed by said pressure for opening said valve, of a safety control for said governor comprising means normally biased to overcome said last named means and close said valve, and means responsive to the pressure on the low pressure side of said valve for holding said biased means against closing said valve so long as the proper pressure conditions exist on the low pressure side of said valve.

7. In a gas distribution system, the combination with a gas governor comprising a valve, biased means normally adapted to open said valve, means actuated by the pressure on the high pressure side of said valve for closing said valve against the force of said biased means, and means responsive to the attainment of a given pressure on the low pressure side of said valve for operating said pressure actuated means, of a safety control for said governor comprising means normally biased to overcome said first named biased means and close said valve, and means responsive to the attainment of a pressure on the low pressure side of the valve in excess of said given pressure for causing the safety control biased means to overcome said first named biased means and close said valve against the force of the latter.

8. In a gas distribution system including a vault into which gas mains extend, the combination with a gas governor comprising a valve and pressure responsive diaphragm means disposed in the lower part of said vault and connected to close said valve, of a safety control for said governor comprising mechanism for shifting said valve and means responsive to a given head of water in said vault for causing said mechanism to close said valve independently of the position of said diaphragm.

9. In a gas distribution system, the combination with a gas governor comprising a valve and pressure responsive diaphragm means connected to close said valve, of a safety control for said governor comprising mechanism for shifting said valve and means responsive to an increase in pressure on the low pressure side of said valve for causing said mechanism to close said valve independently of the position of said diaphragm.

10. In a gas distribution system, the combination with a gas governor comprising a valve, a movable arm operatively connected with said valve to shift the same, means actuated by the pressure on the high pressure side of said valve for moving said arm to control the position of said valve, and regulator means acting against said pressure for controlling the position of said valve, of a safety control for said governor comprising a movable part having a lost motion connection with said arm, means biasing said part and capable of exerting sufficient force through the latter to shift said arm and valve against the force of said pressure actuated means after said lost motion has been taken up, and means responsive to the pressure on the low pressure side of said valve for normally holding said biased part against movement, said lost motion means providing for the control of said valve by said governor.

11. In a gas distribution system including a vault into which gas mains extend, governor mechanism comprising a valve, pressure responsive means for shifting said valve, means open to the atmosphere in said vault for controlling the application of pressure to said pressure responsive means in accordance with the difference between atmospheric pressure in said vault and the pressure on one side of said valve, and means open to the atmosphere in said vault below said pressure controlling means and responsive to a head of liquid against the lower side thereof for closing said valve.

12. Control mechanism for a gas distribution valve, comprising a chamber having a movable wall and communicating with the high pressure side of said valve, means connecting said movable wall with said valve, spring means connected with said movable wall and adapted to yieldingly oppose the movement thereof when the pressure from the high pressure side of said valve acts against said movable wall, and regulator means responsive to the pressure on the low pressure side of said valve for opening communication between said chamber and the low pressure side of said valve and closing the latter through the action of said spring means against said movable wall.

KENNETH S. VAN EPPS.